United States Patent
Wu et al.

(10) Patent No.: US 10,827,222 B2
(45) Date of Patent: Nov. 3, 2020

(54) METHOD AND APPARATUS FOR SWITCHING BIT STREAM TYPE OF VIDEO PLAYING

(71) Applicant: Hangzhou Hikvision Digital Technology Co., Ltd., Hangzhou (CN)

(72) Inventors: Yang Wu, Hangzhou (CN); Bingquan Han, Hangzhou (CN); Xiaojun Chen, Hangzhou (CN); Chunyu Xu, Hangzhou (CN); Zheng Huang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/335,530

(22) PCT Filed: Aug. 23, 2017

(86) PCT No.: PCT/CN2017/098649
§ 371 (c)(1),
(2) Date: Mar. 21, 2019

(87) PCT Pub. No.: WO2018/059164
PCT Pub. Date: Apr. 5, 2018

(65) Prior Publication Data
US 2019/0349635 A1    Nov. 14, 2019

(30) Foreign Application Priority Data

Sep. 30, 2016 (CN) .......................... 2016 1 0873098

(51) Int. Cl.
*H04N 21/462* (2011.01)
*H04N 21/431* (2011.01)
(Continued)

(52) U.S. Cl.
CPC ..... *H04N 21/4621* (2013.01); *H04L 12/1813* (2013.01); *H04L 12/1827* (2013.01);
(Continued)

(58) Field of Classification Search
CPC ..... H04L 12/16–1827; H04L 29/06176; H04L 29/06319–06326;
(Continued)

(56) References Cited

U.S. PATENT DOCUMENTS 5,519,438 A * 5/1996 Elliott .................... H04N 7/148
348/180
6,453,336 B1 * 9/2002 Beyda .................... H04L 29/06
709/204

(Continued)

FOREIGN PATENT DOCUMENTS

AU    2007237357 A1    6/2009
CN    101377920 A    3/2009
(Continued)

OTHER PUBLICATIONS

International Search Report for International Application No. PCT/CN2017/098649 dated Oct. 31, 2017.

*Primary Examiner* — Brendan Y Higa
(74) *Attorney, Agent, or Firm* — Seth L. Hudson; Clements Bernard Walker

(57) ABSTRACT

The embodiments of the present application disclose a method and an apparatus for switching a bit stream type of a video presentation. The method comprises: determining a plurality of video presentations that have been started; determining a current split screen mode according to the number of the started video presentations; determining a bit stream type corresponding to the current split screen mode according to a preset correspondence between split screen modes and bit stream types; and switching a bit stream type (Continued)

of each started video presentation according to the determined bit stream type or bit stream types. The embodiments of the present application avoid a client from running out of memory and crashing.

20 Claims, 4 Drawing Sheets

(51) Int. Cl.
*H04N 21/47* (2011.01)
*H04L 29/06* (2006.01)
*H04N 7/15* (2006.01)
*H04L 12/18* (2006.01)

(52) U.S. Cl.
CPC .. *H04L 29/06374* (2013.01); *H04L 29/06414* (2013.01); *H04L 29/06482* (2013.01); *H04L 65/1093* (2013.01); *H04L 65/403* (2013.01); *H04L 65/601* (2013.01); *H04N 7/15* (2013.01); *H04N 21/4316* (2013.01); *H04N 21/47* (2013.01)

(58) Field of Classification Search
CPC .......... H04L 29/06353–06374; H04L 29/06414–06435; H04L 65/00; H04L 65/1066–1069; H04L 65/1083–1093; H04L 65/403–4053; H04L 65/60–608; H04L 29/06476–06517; H04N 7/15–155; H04N 21/2343–23439; H04N 21/637–6377; H04N 21/64738–64769; H04N 21/4402–440263; H04N 21/4621
See application file for complete search history.

(56) References Cited

U.S. PATENT DOCUMENTS

| | | | |
|---|---|---|---|
| 7,768,543 B2* | 8/2010 | Christiansen | H04L 29/06027 348/14.08 |
| 2004/0201608 A1* | 10/2004 | Ma | H04N 21/4438 715/719 |
| 2006/0215765 A1* | 9/2006 | Hwang | H04N 19/17 375/240.21 |
| 2010/0066808 A1* | 3/2010 | Tucker | H04N 21/44245 348/14.09 |
| 2012/0169883 A1* | 7/2012 | Chang | H04N 21/23418 348/159 |
| 2013/0339451 A1* | 12/2013 | Nyberg | H04M 3/567 709/204 |
| 2015/0201161 A1* | 7/2015 | Lachapelle | H04N 7/15 348/14.07 |
| 2015/0350603 A1* | 12/2015 | Assem Aly Salama | H04L 65/80 348/14.09 |
| 2016/0182834 A1* | 6/2016 | Sivasankaran | H04N 21/482 386/230 |
| 2016/0212486 A1 | 7/2016 | Liu et al. | |
| 2016/0309118 A1* | 10/2016 | Li | H04N 7/147 |
| 2017/0332116 A1 | 11/2017 | Lee | |

FOREIGN PATENT DOCUMENTS

| | | |
|---|---|---|
| CN | 101379741 A | 3/2009 |
| CN | 101557495 A | 10/2009 |
| CN | 105407323 A | 3/2016 |
| CN | 105898370 A | 8/2016 |
| EP | 2 555 517 A1 | 2/2013 |
| WO | 2016/085094 A1 | 6/2016 |

* cited by examiner

METHOD AND APPARATUS FOR SWITCHING BIT STREAM TYPE OF VIDEO PLAYING

The present application claims the priority to a Chinese patent application No. 201610873098.0, filed with the China National Intellectual Property Administration on Sep. 30, 2016 and entitled "Method and Apparatus for Switching Bit Stream Type of Video Playing", which is incorporated herein by reference in its entirety.

TECHNICAL FIELD

The present application relates to the field of techniques for videos, and in particular, to a method and an apparatus for switching a bit stream type of a video presentation.

BACKGROUND

The bit stream type is a bit stream parameter rule composed by video quality parameters (e.g., resolutions, frame rates, code rates, etc.). The bit stream types may include, such as, high definition, standard definition, and smoothness. The bit stream types may be ordered by video quality as: high definition>standard definition>smoothness. The higher the video quality is, the higher the resolution, the code rate, the frame rate, and the bandwidth required for video presentation will be. The lower the video quality is, the lower the resolution, the code rate, the frame rate, and the bandwidth required for video presentation will be.

In playing a video, a client often desires a bit stream type with high video quality. In a case that there is only one split screen, i.e., only a single video is presented, the bandwidth required is small, and a bit stream type with high video quality may be employed, such as the high definition bit stream type. However, in a case that there are multiple split screens in, i.e., multiple videos are presented, the bandwidth required is high, and using a bit stream type with high video quality is no longer proper. In addition, the client may be provided with a plurality of split screen modes, e.g., 1-split-screen mode, 4-split-screen mode, 9-split-screen mode, and 16-split-screen mode. When the client switches the split screen mode, if the video qualities of the video presentations in respective split screens are not properly adjusted, namely the bit stream types of the video presentations in respective split screens are not properly adjusted, it is possible to cause the client to run out of memory and to crash.

SUMMARY

The embodiments of the present application provide a method and an apparatus for switching a bit stream type of a video presentation, to prevent the client from running out of memory and crashing.

To achieve the above objective, an embodiment of the present application discloses a method for switching a bit stream type of a video presentation. The method includes:
determining a plurality of video presentations that have been started;
determining a current split screen mode according to the number of the started video presentations;
determining a bit stream type corresponding to the current split screen mode according to a preset correspondence between split screen modes and bit stream types; and
switching a bit stream type of each started video presentation according to the determined bit stream type or bit stream types.

Optionally, the preset correspondence between the split screen modes and the bit stream types includes a preset correspondence between the split screen modes and default bit stream types.

The step of determining a bit stream type corresponding to the current split screen mode according to a preset correspondence between split screen modes and bit stream types includes:
determining a default bit stream type corresponding to the current split screen mode according to the preset correspondence between the split screen modes and the default bit stream types.

The step of switching a bit stream type of each started video presentation according to the determined bit stream type or bit stream types includes:
switching the bit stream type of each started video presentation to the determined default bit stream type.

Optionally, the preset correspondence between the split screen modes and the bit stream types includes a preset correspondence between the split screen modes and default bit stream types and a preset correspondence between the split screen modes and supported bit stream types.

The step of determining a bit stream type corresponding to the current split screen mode according to a preset correspondence between split screen modes and bit stream types includes:
determining a default bit stream type corresponding to the current split screen mode according to the preset correspondence between the split screen modes and the default bit stream types; and
determining a supported bit stream type corresponding to the current split screen mode according to the preset correspondence between the split screen modes and the supported bit stream types, wherein the supported bit stream type includes at least one bit stream type.

The step of switching a bit stream type of each started video presentation according to the determined bit stream type or bit stream types includes:
switching the bit stream type of each started video presentation to one of the determined default bit stream type and the supported bit stream type.

Optionally, if the number of split screens corresponding to the current split screen mode is greater than or equal to the number of split screens corresponding to a split screen mode determined last time, the step of switching the bit stream type of each started video presentation to one of the determined default bit stream type and the supported bit stream type includes:
switching a bit stream type of each newly started video presentation to the determined default bit stream type;
for each previously started video presentation, determining whether a bit stream type of the previously started video presentation is included in the determined supported bit stream type; and
if it is determined that the bit stream type of the previously started video presentation is included in the determined supported bit stream type, rejecting the switching of the bit stream type of the previously started video presentation;
if it is determined that the bit stream type of the previously started video presentation is not included in the determined supported bit stream type, switching the bit stream type of the previously started video presentation to a bit stream type in the determined supported bit stream type.

Optionally, the step of switching the bit stream type of the previously started video presentation to a bit stream type in the determined supported bit stream type includes:

switching the bit stream type of the previously started video presentation to a bit stream type with the highest video quality in the determined supported bit stream type.

Optionally, if the number of split screens corresponding to the current split screen mode is less than the number of split screens corresponding to the split screen mode determined last time, the step of switching the bit stream type of each started video presentation to one of the determined default bit stream type and the supported bit stream type include:

for each previously started video presentation, determining whether a video quality corresponding to the bit stream type of this video presentation is lower than a video quality corresponding to the determined default bit stream type; and if it is determined that the video quality corresponding to the bit stream type of this video presentation is lower than the video quality corresponding to the determined default bit stream type, switching the bit stream type of this video presentation to the determined default bit stream type;

if it is determined that the video quality corresponding to the bit stream type of this video presentation is not lower than the video quality corresponding to the determined default bit stream type, rejecting the switching of the bit stream type of this video presentation.

Optionally, the method further includes:

receiving a request for switching a bit stream type of a started video presentation, wherein the request contains a target bit stream type that is a bit stream type in the supported bit stream types corresponding to the current split screen mode; and switching the bit stream type of the started video presentation to the target bit stream type.

Optionally, after the step of switching a bit stream type of each started video presentation according to the determined bit stream type or bit stream types, the method further includes:

determining whether each started video presentation is being recorded; and for each video presentation being recorded, generating a video file for the video presentation being recorded according to a video recorded, and recording the video presentation under the bit stream type that has been switched to; and obtaining and merging all video files of the video presentation after the recording of the video presentation is finished.

To achieve the above objective, an embodiment of the present application further discloses an apparatus for switching a bit stream type of a video presentation. The apparatus includes:

a presentation determining unit, configured for determining a plurality of video presentations that have been started;

a mode determining unit, configured for determining a current split screen mode according to the number of the started video presentations;

a type determining unit, configured for determining a bit stream type corresponding to the current split screen mode according to a preset correspondence between split screen modes and bit stream types; and a first type switching unit, configured for switching a bit stream type of each started video presentation according to the determined bit stream type or bit stream types.

Optionally, the preset correspondence between the split screen modes and the bit stream types includes a preset correspondence between the split screen modes and default bit stream types.

The type determining unit is specifically configured for:

determining a default bit stream type corresponding to the current split screen mode according to the preset correspondence between the split screen modes and the default bit stream types.

The first type switching unit is specifically configured for:

switching the bit stream type of each started video presentation to the determined default bit stream type.

Optionally, the preset correspondence between the split screen modes and the bit stream types includes a preset correspondence between the split screen modes and default bit stream types and a preset correspondence between the split screen modes and supported bit stream types.

The type determining unit is specifically configured for:

determining a default bit stream type corresponding to the current split screen niode according to the preset correspondence between the split screen modes and the default bit stream types; and determining a supported bit stream type corresponding to the current split screen mode according to the preset correspondence between the split screen modes and the supported bit stream types, wherein the supported bit stream type includes at least one bit stream type.

The first type switching unit is specifically configured for:

switching the bit stream type of each started video presentation to one of the determined default bit stream type and the supported bit stream type.

Optionally, the first type switching unit includes:

a first type switching sub-unit, configured for switching a bit stream type of each newly started video presentation to the determined default bit stream type, if the number of split screens corresponding to the current split screen mode is greater than or equal to the number of split screens corresponding to a split screen mode determined last time;

a first type determining sub-unit, configured for, for each previously started video presentation, determining whether a bit stream type of the previously started video presentation is included in the determined supported bit stream type, if the number of split screens corresponding to the current split screen mode is greater than or equal to the number of split screens corresponding to the split screen mode determined last time;

a first type-switching rejecting sub-unit, configured for rejecting the switching of the hit stream type of the previously started video presentation, when the first type determining sub-unit determines that the bit stream type of the previously started video presentation is included in the determined supported bit stream type; and a second type switching sub-unit, configured for switching the bit stream type of the previously started video presentation to a bit stream type in the determined supported bit stream type, when the first type determining sub-unit determines that the bit stream type of the previously started video presentation is not included in the determined supported bit stream type.

Optionally, the second type switching sub-unit is specifically configured for:

switching the bit stream type of the previously started video presentation to a bit stream type with the highest video quality in the determined supported bit stream type.

Optionally, the first type switching unit includes:

a second type determining sub-unit, configured for, for each previously started video presentation, determining whether a video quality corresponding to the bit stream type of the previously started video presentation is lower than a video quality corresponding to the determined default bit stream type, if the number of split screens corresponding to the current: split screen mode is less than the number of split screens corresponding to the split screen mode determined last time;

a third type switching sub-unit, configured for switching the bit stream type of this video presentation to the determined default bit stream type, when the second type determining sub-unit determines that the video quality corresponding to the bit stream type of this video presentation is lower than the video quality corresponding to the determined default bit stream type; and a second type-switching rejecting sub-unit, configured for rejecting the switching of the bit stream type of this video presentation, when the second type determining sub-unit determines that the video quality corresponding to the bit stream type of this video presentation is not lower than the video quality corresponding to the determined default bit stream type.

Optionally, the apparatus further includes:

a request receiving unit, configured for receiving a request for switching a bit stream type of a started video presentation, wherein the request contains a target bit stream type that is a bit stream type in the supported bit stream types corresponding to the current split screen mode; and a second type switching unit, configured: for switching the bit stream type of the started video presentation to the target bit stream type.

Optionally, the apparatus further includes:

a record determining unit, configured for determining whether each started video presentation is being recorded, after switching the bit stream type of each started video presentation according to the determined bit stream type and bit stream types; and a record processing unit, configured for, for each video presentation being recorded, generating a video file for the video presentation being recorded according to a video recorded, and recording the video presentation under the bit stream type that has been switched to; and obtaining and merging all video files of the video presentation after the recording of the video presentation is finished.

To achieve the objectives mentioned above, an embodiment of the application further provides an electronic device. The electronic device includes a processor and a memory.

The memory is configured for storing an application program.

The processor is configured for executing the application program stored in the memory to carry out the method for switching a bit stream type of a video presentation discussed above.

To achieve the objectives mentioned above, an embodiment of the application further provides an application program that, when executed, performs the method for switching a bit stream type of a video presentation discussed above.

To achieve the objectives mentioned above, an embodiment of the application further provides a storage medium for storing an application program. The application program, when executed, performs the method for switching a bit stream type of a video presentation discussed above.

The embodiments of the present application provide a method and an apparatus for switching a bit stream type of a video presentation. After a plurality of video presentations that have been started are determined, the current split screen mode is determined according to the number of the started video presentations. The bit stream type corresponding to the current split screen mode is determined according to the preset correspondence between the split screen modes and the bit stream types. The bit stream types of the started video presentations are switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

BRIEF DESCRIPTION OF THE DRAWINGS

In order to explain the technical solutions of embodiments of the present application or of the relevant art, a simple introduction of the drawings required in describing the embodiments and the relevant art will be given. Obviously; the drawings described below are just those for some embodiments of the present application and other drawings may be obtained by those of ordinary skills in the art without any creative efforts based on the drawings herein.

DETAILED DESCRIPTION

The technical solution of the application will be described in detail with reference to the drawings of embodiments of the present application. Obviously, the embodiments described are only some instead of all of the embodiments of the present application. All further embodiments obtained by those of ordinary skills in the art based on the embodiments herein without any creative efforts are within the scope of the present application.

The present application will be explained in detail with specific embodiments below.

Figure 1:
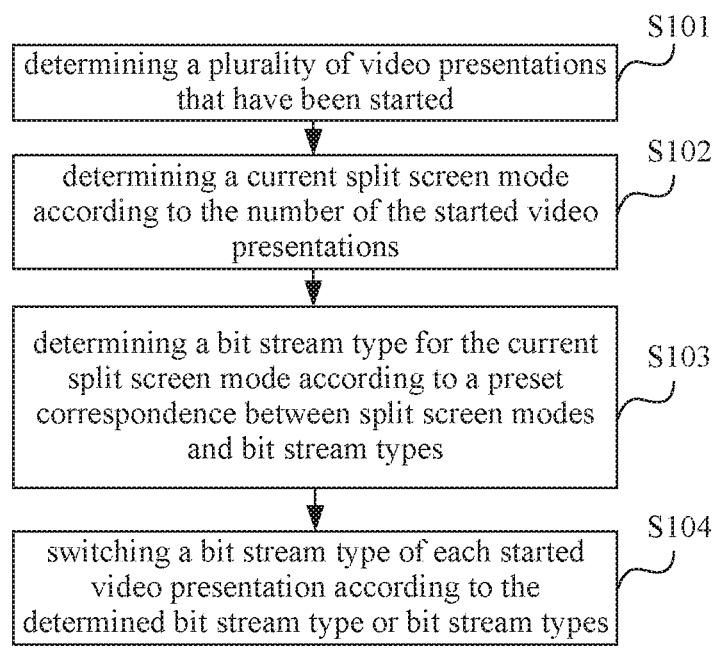
FIG. 1 is a flow chart illustrating a method for switching a bit stream type of a video presentation according to an embodiment of the present application.

Referring to FIG. 1, FIG. 1 is a flow chart illustrating a method for switching a bit stream type of a video presentation according to an embodiment of the present application. The method includes:

S101: determining a plurality of video presentations that have been started.

Generally, the video presentations that have been started may be determined based on the video content of several channels of video presentations that is received. For example, if the video content for 1 video presentation is received, it is determined that 1 video presentation has been started; and if the video content for 4 channels of video presentations is received, it is determined that 4 channels of video presentations have been started.

S102: determining a current split screen mode according to the number of the started video presentations.

The client may be provided with a plurality of split screen modes, for example, a 1-split-screen mode, 4-split-screen mode, 9-split-screen mode, and 16-split screen mode. The current split screen mode may be determined according to the number of the channels of the started video presentations and a plurality of provided split screen modes.

For example, the split screen modes provided for the client are the 1-split-screen mode, 4-split-screen mode, 9-split-screen mode, and 16-split-screen mode. If 1 video presentation has been started, it may determine that the current split screen mode is the 1-split-screen mode. If 2, 3 or 4 channels of video presentations have been started, it may determine that the current split screen mode is the 4-split-screen mode. If 5, 6, 7, 8 or 9 channels of video presentations have been started, it may determine that the current split screen mode is the 9-split-screen mode. If 10, 11, 12, 13, 14, 15 or 16 channels of video presentations have been started, it may determine that the current split screen mode is the 16-split-screen mode, and so on.

S103: determining a bit stream type corresponding to the current split screen mode according to a preset correspondence between split screen modes and bit stream types.

S104: switching a bit stream type of each started video presentation according to the determined bit stream type or bit stream types.

In an embodiment of the present application, the preset correspondence between the split screen modes and the bit stream types may be a preset correspondence between the split screen modes and default bit stream types.

In this case, S103 may be:
determining a default bit stream type corresponding to the current split screen mode according to the preset correspondence between the split screen modes and the default bit stream types.

S104 may be:
switching the bit stream type of each started video presentation to the determined default bit stream type.

For example, the preset correspondence between the split screen modes and the default bit stream types is as shown in Table 1.

TABLE 1

| Split screen mode | Default bit stream type |
|---|---|
| 1-split-screen | High definition |
| 4-split-screen | Standard definition |
| 9-split-screen | Smoothness |
| 16-split-screen | Smoothness |

If it is determined that 1 video presentation A has been currently started, the current split screen mode may be determined as the 1-split-screen mode. The default bit stream type corresponding to the 1-split-screen mode is high definition according to the Table 1. The bit stream type of the video presentation A is then switched to high definition. In a next detection, if it is determined that 2 channels of video presentations A and B have been currently started, the current split screen mode may be determined as the 4-split-screen mode. The default bit stream type corresponding to the 4-split-screen mode is standard definition according to the Table 1. The bit stream types of the video presentations A and B are then switched to standard definition; and so on.

In another embodiment of the present application, the preset correspondence between the split screen modes and the bit stream types may include a preset correspondence between the split screen modes and the default bit stream types and a preset correspondence between the split screen modes and supported bit stream types. The supported bit stream types include at least one bit stream type.

Figure 2:
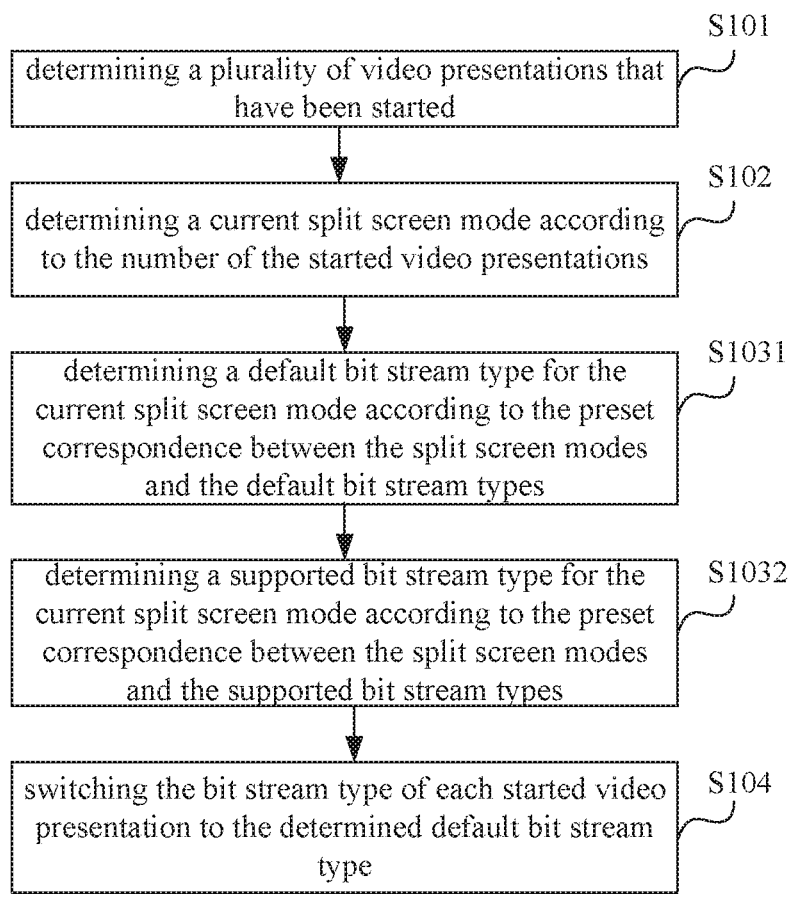
FIG. 2 is another flow chart illustrating a method for switching a bit stream type of a video presentation according to an embodiment of the present application.

In this case, referring to FIG. 2, S103 may include:
S1031: determining a default bit stream type corresponding to the current split screen mode according to the preset correspondence between the split screen modes and the default bit stream types; and
S1032: determining a supported bit stream type corresponding to the current split screen mode according to the preset correspondence between the split screen modes and the supported bit stream types.

Here, S1031 may be performed simultaneously as S1032, or may be performed before or after S1032, which is not limited herein.

S104 may be:
switching the bit stream type of each started video presentation to one of the determined default bit stream type and the supported bit stream type.

It should be noted that a supported bit stream type is a bit stream type that is switchable. A default bit stream type may be one of the supported bit stream types.

The current split screen mode determined each time may or may not be the same as the split screen mode determined last time. If they are the same, it means that the number of split screens corresponding to the current split screen mode is equal to the number of split screens corresponding to the split screen mode determined last time. If they are different, there are two situations: one is that the number of split screens corresponding to the current split screen mode is greater than the number of split screens corresponding to the split screen mode determined last time; the other is that the number of split screens corresponding to the current split screen mode is smaller than the number of split screens corresponding to the split screen mode determined last time.

Figure 3:
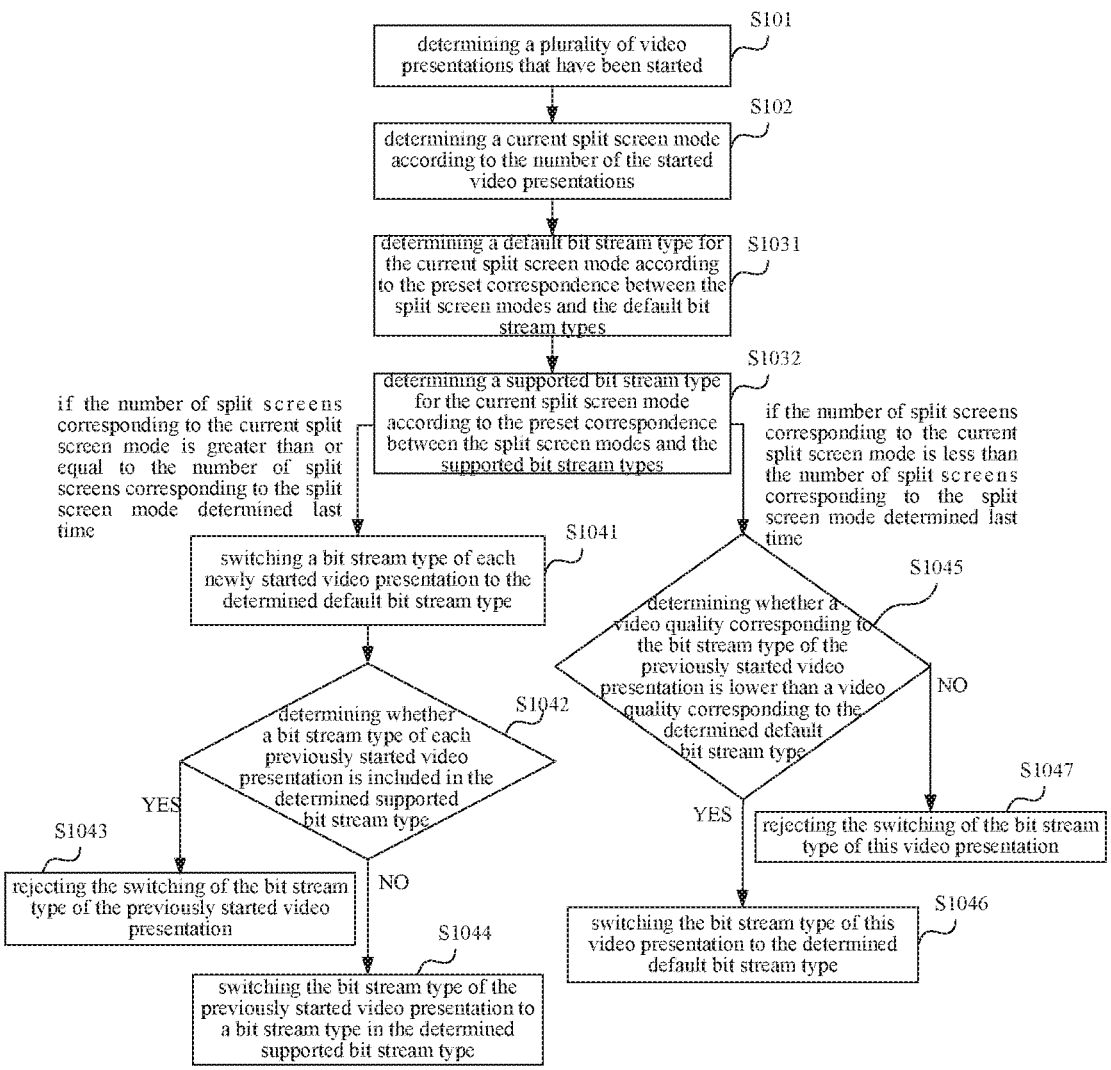
FIG. 3 is another flow chart illustrating a method for switching a bit stream type of a video presentation according to an embodiment of the present application.

In an embodiment of the present application, for different situations, on the basis of FIG. 2, the adjustment of a bit stream type of each video presentation may be as shown in FIG. 3.

If the number of split screens corresponding to the current split screen mode is greater than or equal to the number of split screens corresponding to the split screen mode determined last time, S104 may include:
S1041: switching a bit stream type of each newly started video presentation to the determined default bit stream type.

Here, a newly started video presentation is a video presentation that has been started currently but has not been started during last determination.

S1042: for each previously started video presentation, determining whether a bit stream type of the each previously started video presentation is included in the determined supported bit stream type; and if it is determined that the bit stream type of the each previously started video presentation is included in the determined supported bit stream type, performing S1043, if it is determined that the bit stream type of the each previously started video presentation is not included in the determined supported bit stream type, performing S1044.

Here, the previously started video presentation is a video presentation that has been started during both current determination and last determination.

It should be noted that S1041 may be performed simultaneously as S1042, or may be performed before or after S1042, which is not limited herein.

S1043: rejecting the switching of the bit stream type of the previously started video presentation.

S1044: switching the bit stream type of the previously started video presentation to a bit stream type in the determined supported bit stream type.

For example, the preset correspondence between the split screen modes and the default bit stream types and the preset correspondence between the split screen modes and the supported bit stream types are as shown in Table 2.

TABLE 2

| Split screen mode | Default bit stream type | Supported bit stream type |
|---|---|---|
| 1-split-screen | High definition | High definition, Standard definition, Smoothness |
| 4-split-screen | Standard definition | High definition, Standard definition, Smoothness |
| 9-split-screen | Smoothness | Standard definition, Smoothness |
| 16-split-screen | Smoothness | Smoothness |

If it is determined that 1 video presentation A has been started, the current split screen mode may be determined as the 1-split-screen mode. The default bit stream type corresponding to the 1-split-screen mode is high definition according to Table 2. The bit stream type of the video presentation A is then switched to high definition, as shown in Table 3.

TABLE 3

| A. High definition |
|---|

In a next detection, if it is determined that 2 channels of video presentations A and B have been started, the current split screen mode is determined as the 4-split-screen mode. The default bit stream type corresponding to the 4-split-screen mode is standard definition according to Table 2. The supported bit stream types corresponding to the 4-split-screen mode are high definition, standard definition, and smoothness according to Table 2. The video presentation B is a newly started video presentation, and the bit stream type of the video presentation B is switched to the default bit stream type, i.e., standard definition. The video presentation A is a previously started video presentation, and the bit stream type of the video presentation A is one of the determined supported bit stream types. Thus, the bit stream type of the video presentation A will not be switched, namely, the bit stream type of the video presentation A remains being high definition. These are shown in Table 4.

TABLE 4

| A. High definition | B. Standard definition |
|---|---|

In a next detection, if it is determined that 3 channels of video presentations A, B and C have been started or 4 channels of video presentations A, B, C and D have been started, the current split screen mode is determined as the 4-split-screen mode, which is the same as the split screen mode determined last time. The video presentations C and/or D are newly started video presentations, and the bit stream types of the video presentations C and/or D are switched to the default bit stream type, i.e., standard definition. The video presentations A and B are previously started video presentations, and the bit stream types of both video presentations A and B (high definition and standard definition) are included in the supported bit stream types corresponding to the 4-split-screen mode. Thus, the bit stream types of the video presentations A and B will remain unchanged. These are shown in Table 5.

TABLE 5

| A. High definition | B. Standard definition |
|---|---|
| C. Standard definition | D. Standard definition |

In a next detection, if 5 channels of video presentations A, B, C, D and E have been started, the current split screen mode is determined as the 9-split-screen mode. The default bit stream type corresponding to the 9-split-screen mode is smoothness according to Table 2. The supported bit stream types corresponding to the 9-split-screen mode are standard definition and smoothness according to Table 2. The video presentation E is a newly started video presentation, and the bit stream type of the video presentation E is switched to the default bit stream type, i.e., smoothness. The video presentations A, B, C and D are previously started video presentations. Here, the bit stream types of the video presentations B, C and D are included in the determined supported bit stream types. Thus, the bit stream types of the video presentations B, C and D will not be switched, namely, the bit stream types of the video presentations B, C and D remain being standard definition. The bit stream type of the video presentation A is not included in the determined supported bit stream types. Thus, the bit stream type of the video presentation A is switched to one of the determined supported bit stream types (such as standard definition). These are shown in Table 6. The bit stream types of other video presentations are switched similarly

TABLE 6

| A. Standard definition | B. Standard definition | E. Smoothness |
|---|---|---|
| C. Standard definition | D. Standard definition | |

In an embodiment of the present application, the video quality may be identified by parameters including such as resolution, frame rate, and code rate. The higher the video quality is, the clearer the video presentation will be. Therefore, the client often desires a bit stream type with high video quality. As a result, S1044 may be switching the bit stream type of the previously started video presentation to a bit stream type with the highest video quality in the determined supported bit stream type. As noted above, when the video presentation E is started, the current split screen mode is changed from the 4-split-screen mode to the 9-split-screen mode. The supported bit stream types corresponding to the 9-split-screen mode are standard definition and smoothness, which can be ordered by video quality as standard definition>smoothness. Therefore, the bit stream type of the video presentation A is switched from high definition to standard definition.

If the number of split screens corresponding to the current split screen mode is less than the number of split screens corresponding to the split screen mode determined last time, S104 may include:

S1045: for each previously started video presentation, determining whether a video quality corresponding to the bit stream type of the each previously started video presentation is lower than a video quality corresponding to the determined default bit stream type; and if it is determined that the video quality corresponding to the bit stream type of the each previously started video presentation is lower than the video quality corresponding to the determined default bit stream type, performing S1046, if it is determined that the video quality corresponding to the bit stream type of the each previously started video presentation is not lower than the video quality corresponding to the determined default bit stream type, performing S1047.

S1046: switching the bit stream type of this video presentation to the determined default bit stream type.

S1047: rejecting the switching of the bit stream type of this video presentation.

For example, the preset correspondence between the split screen modes and the bit stream types are as shown in Table 2, and 16 channels of video presentations have been started, which are A, B, C, D, E, F, G, H, I, J, K, L, M, N, O, and P. The current split screen mode is thus determined as the 16-split-screen mode. Both the default bit stream type and the supported bit stream type corresponding to the 16-split-screen mode are determined as smoothness according to Table 2. Thus, the bit stream types of all of the video presentations are switched to smoothness, as shown in Table 7.

TABLE 7

| A. Smoothness | B. Smoothness | E. Smoothness | J. Smoothness |
| C. Smoothness | D. Smoothness | F. Smoothness | K. Smoothness |
| G. Smoothness | H. Smoothness | I. Smoothness | L. Smoothness |
| M. Smoothness | N. Smoothness | O. Smoothness | P. Smoothness |

In a next detection, if the 7 channels of video presentations J, K, L, N, O and P are determined to have been closed, it is determined that 9 channels of video presentations have been started, which are A, B, C, D, F, F, G, H and I, and the current split screen mode is the 9-split-screen mode. The default bit stream type corresponding to the 9-split-screen mode is determined as smoothness according to Table 2. The supported bit stream types corresponding to the 9-split-screen mode are determined as smoothness and standard definition according to Table 2. The bit stream type of each started video presentation is the same as the determined default bit stream type. That is, the video quality corresponding to the bit stream type of each started video presentation is not less than the video quality for the determined default bit stream type. Thus, the bit stream type of each of the video presentations is not switched and remains being smoothness, as shown in Table 8.

TABLE 8

| A. Smoothness | B. Smoothness | E. Smoothness |
| C. Smoothness | D. Smoothness | F. Smoothness |
| G. Smoothness | H. Smoothness | I. Smoothness |

In a next detection, if 3 channels of video presentations F, F, G, H and I are determined to have been closed, it is determined that 4 channels of video presentations have been started, which are A, B, C and D, and the current split screen mode is thus the 4-split-screen mode. The default bit stream type corresponding to the 4-split-screen mode is determined as standard definition according to Table 2. The supported bit stream types corresponding to the 4-split-screen mode are determined as smoothness, standard definition and high definition according to Table 2. The video quality corresponding to smoothness is lower than the video quality corresponding to standard definition. That is, the video quality corresponding to the bit stream type of each started video presentation is less than the video quality for the determined default bit stream type. Thus, the bit stream type of each of the video presentations is switched to standard definition, as shown in Table 9. The bit stream types of other video presentations are switched similarly.

TABLE 9

| A. Standard definition | B. Standard definition |
| C. Standard definition | D. Standard definition |

In an embodiment of the present application, the bit stream type of each video presentation may be adjusted depending on the requirements of the user. Generally, the user inputs a request for switching the bit stream type of a started video presentation according to the supported bit stream types of the current split screen mode. The request for switching the type contains a target bit stream type. The target bit stream type is one of the supported bit stream types corresponding to the current split screen mode. Upon receiving the request for switching the type, the bit stream type of that started video presentation is switched to the target bit stream type.

For example, as shown in Table 9, the supported bit stream types corresponding to the 4-split-screen mode are smoothness, standard definition, and high definition. If a request for switching the bit stream type of the video presentation A is received and the target bit stream type in this request is high definition, the bit stream type of the video presentation A is switched to high definition, as shown in Table 10.

TABLE 10

| A. High definition | B. Standard definition |
| C. Standard definition | D. Standard definition |

In an embodiment of the present application, the client may record a video presentation. Such recording may be interrupted by the switching between bit stream types. At this point, for the integrity of the recording of the video presentation, after switching the bit stream type of each started video presentation according to the determined bit stream types, it may determine whether each started video presentation is being recorded. For each video presentation being recorded, a video file for the video presentation is generated from the video being recorded, and the video presentation is recorded under the bit stream type that has been switched to. After the recording of the video presentation is finished, all video files of the video presentation are obtained and merged.

For example, it is 10:00 currently, the current video presentation A is recorded from 10:00. At 10:15, the bit stream type of the video presentation A is switched to a bit stream type a. The recording of the video presentation A is thus interrupted or stopped, and a video file f1 is generated for the video presentation A which is recorded from 10:00 to 10:15. The recording of the video presentation A is restarted and proceeds under the bit stream type a. At 10:25, the bit stream type of the video presentation A is switched to a bit stream type b. The recording of the video presentation A is thus interrupted, and a video file f2 is generated for the video presentation A which is recorded from 10:15 to 10:25. The recording of the video presentation A is restarted and proceeds under the bit stream type b. At 10:34, the bit stream type of the video presentation A is switched to a bit stream type c. The recording of the video presentation A is thus interrupted, and a video file f3 is generated for the video presentation A which is recorded from 10:25 to 10:34. The recording of the video presentation A is restarted and proceeds under the bit stream type c. At 10:50, the recording of the video presentation A is stopped, and a video file f4 is generated for the video presentation A which is recorded from 10:34 to 10:50. All the video files (f1, f2, f3, and f4) of the video presentation A are obtained and are merged to create a complete video file of the video presentation A.

The embodiments of the present application provide a method for switching a bit stream type of a video presentation. After a plurality of channels of video presentations that have been started are determined, the current split screen mode is determined according to the number of channels of the determined video presentations. The bit stream type corresponding to the current split screen mode is determined according to the preset correspondence between the split screen modes and the hit stream types. The bit stream type of each started video presentation is switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

Figure 4:
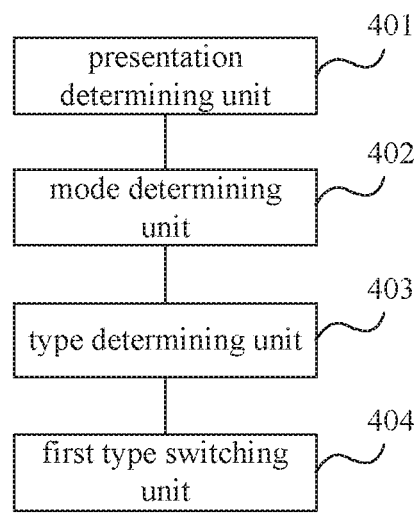
FIG. 4 is a diagram illustrating the structure of an apparatus for switching a bit stream type of a video presentation according to an embodiment of the present application.

Referring to FIG. 4, FIG. 4 is a diagram illustrating the structure of an apparatus for switching the bit stream type of a video presentation according to an embodiment of the present application. The apparatus includes:

a presentation determining unit 401, configured for determining a plurality of video presentations that have been started;

a mode determining unit 402, configured for determining a current split screen mode according to the number of the started video presentations;

a type determining unit 403, configured for determining a bit stream type corresponding to the current split screen mode according to a preset correspondence between split screen modes and bit stream types; and a first type switching unit 404, configured for switching a bit stream type of each started video presentation according to the determined bit stream type or bit stream types.

In an embodiment of the present application, the preset correspondence between the split screen modes and the bit stream types includes a preset correspondence between the split screen modes and default bit stream types.

In this case, the type determining unit 403 may be specifically configured for:

determining a default bit stream type corresponding to the current split screen mode according to the preset correspondence between the split screen modes and the default bit stream types.

The first type switching unit 404 may be specifically configured for:

switching the bit stream type of each started video presentation to the determined default bit stream type.

In an embodiment of the present application; the preset correspondence between the split screen modes and the bit stream types includes a preset correspondence between the split screen modes and default bit stream types and a preset correspondence between the split screen modes and supported bit stream types.

In this case, the type determining unit 403 may be specifically configured for:

determining a default bit stream type corresponding to the current split screen mode according to the preset correspondence between the split screen modes and the default bit stream types; and determining a supported bit stream type corresponding to the current split screen mode according to the preset correspondence between the split screen modes and the supported bit stream types, wherein the supported bit stream type includes at least one bit stream type.

The first type switching unit 404 may be specifically configured for:

switching the bit stream type of each started video presentation to one of the determined default bit stream type and the supported bit stream type.

Figure 5:
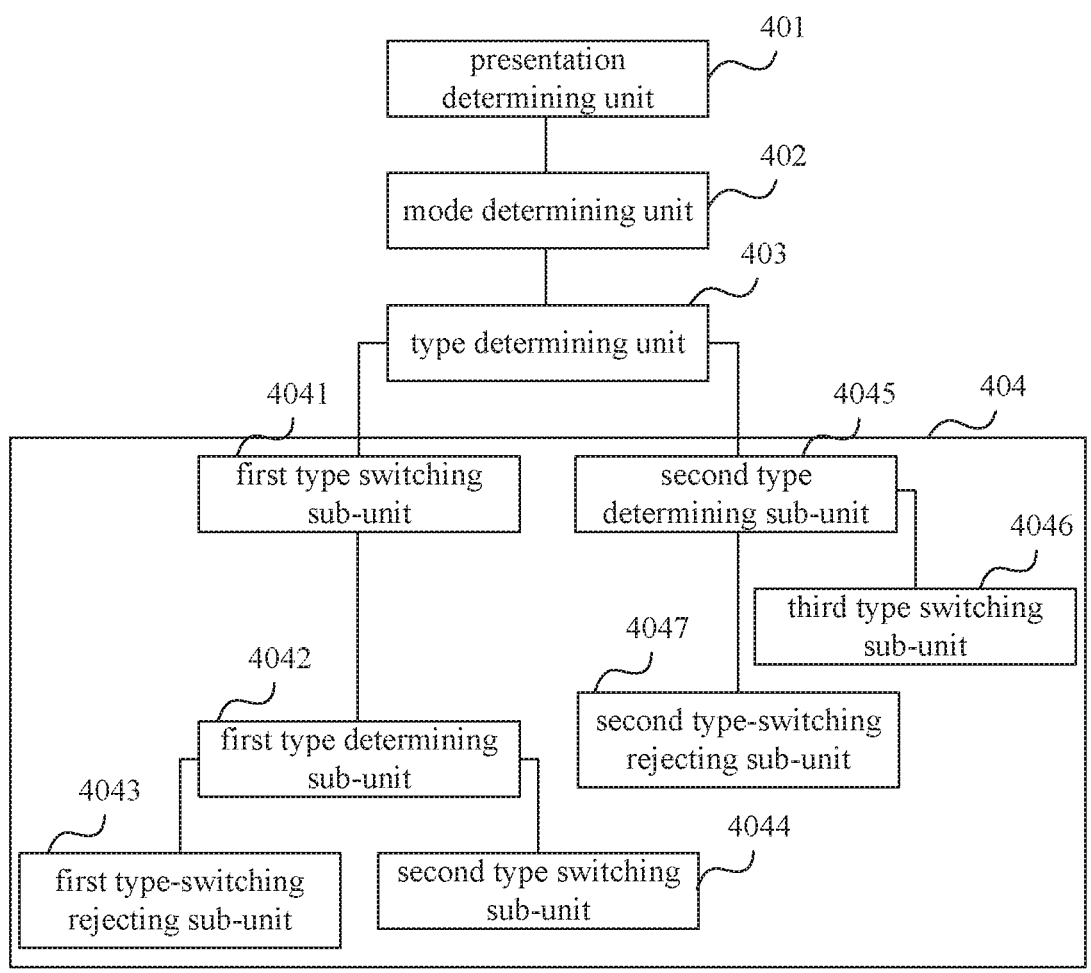
FIG. 5 is another diagram illustrating the structure of an apparatus for switching a bit stream type of a video presentation according to an embodiment of the present application.

In an embodiment of the present application, referring to FIG. 5, the first type switching unit 404 may include:

a first type switching sub-unit 4041, configured for switching a bit stream type of each newly started video presentation to the determined default bit stream type, if the number of split screens corresponding to the current split screen mode is greater than the number of split screens corresponding to the split screen mode determined last time;

a first type determining sub-unit 4042, configured for, for each previously started video presentation, determining whether a bit stream type of the previously started video presentation is included in the determined supported bit stream type, if the number of split screens corresponding to the current split screen mode is greater than the number of split screens corresponding to the split screen mode determined last time;

a first type-switching rejecting sub-unit 4043, configured for rejecting the switching of the bit stream type of the previously started video presentation, when the first type determining sub-unit 4042 determines that the hit stream type of the previously started video presentation is included in the determined supported bit stream type; and a second type switching sub-unit 4044, configured for switching the bit stream type of the previously started video presentation to a bit stream type in the determined supported bit stream type, when the first type determining sub-unit 4042 determines that the bit stream type of the previously started video presentation is not included in the determined supported bit stream type.

In an embodiment of the present application, the second type switching sub-unit 4044 may be specifically configured for:

switching the bit stream type of the previously started video presentation to a bit stream type with the highest video quality in the determined supported bit stream type.

In an embodiment of the present application, referring to FIG. 5, the first type switching unit 404 may include:

a second type determining sub-unit 4045, configured for, for each started video presentation, determining whether a video quality corresponding to the bit stream type of the video presentation is lower than a video quality corresponding to the determined default bit stream type, if the number of split screens corresponding to the current split screen mode is less than the number of split screens corresponding to the split screen mode determined last time;

a third type switching sub-unit 4046, configured for switching the bit stream type of this video presentation to the determined default bit stream type, when the second type determining sub-unit 4045 determines that the video quality corresponding to the bit stream type of the video presentation is lower than the video quality corresponding to the determined default bit stream type; and a second type-switching rejecting sub-unit 4047, configured for rejecting the switching of the bit stream type of this video presentation, when the second type determining subunit 4045 determines that the video quality corresponding to the bit stream type of the video presentation is not lower than the video quality corresponding to the determined default bit stream type.

In an embodiment of the present application, the apparatus for switching the bit stream type of a video presentation may further include:

a request receiving unit (not shown in FIG. 4), configured for receiving a request for switching a bit stream type of a started video presentation, wherein the request contains a target bit stream type that is a bit stream type in the supported bit stream types corresponding to the current split screen mode; and a second type switching-unit (not shown in FIG. 4), configured for switching the bit stream type of the started video presentation to the target bit stream type.

In an embodiment of the present application, the apparatus for switching the bit stream type of a video presentation may farther includes:

a record determining unit (not shown in FIG. 4), configured for determining whether each started video presentation is being recorded, after switching the bit stream type of each started video presentation according to the determined bit stream type; and a record processing unit (not shown in FIG. 4), configured for, for each video presentation being currently recorded, generating a video file for the video presentation according to a video recorded, and recording the video presentation under the bit stream type that has been switched to; and obtaining and merging all video files of the video presentation after the recording of the video presentation is finished.

The embodiments of the present application provide an apparatus for switching the bit stream type of a video presentation. After a plurality of channels of video presentations that have been started are determined, the current split screen mode is determined according to the number of channels of the determined video presentations. The bit stream type corresponding to the current split screen mode is determined according to the preset correspondence between the split screen modes and the bit stream types. The bit stream type of each started video presentation is switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

An embodiment of the application further provides an electronic device, which includes a processor and a memory.

The memory is configured for storing an application program.

The processor is configured for executing the application program stored in the memory to carry out the method for switching a bit stream type of a video presentation. The method for switching a bit stream type of a video presentation includes:

determining a plurality of video presentations that have been started;

determining a current split screen mode according to the number of the started video presentations;

determining a bit stream type corresponding to the current split screen mode according to a preset correspondence between split screen modes and bit stream types; and switching a bit stream type of each started video presentation according to the determined bit stream type or bit stream types.

In the embodiments above, after a plurality of channels of video presentations that have been started are determined, the current split screen mode is determined according to the number of channels of the determined video presentations. The bit stream type corresponding to the current split screen mode is determined according to the preset correspondence between the split screen modes and the bit stream types. The bit stream type of each started video presentation is switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

The communication bus may be a PCI (Peripheral Component Interconnect) bus, an EISA (Extended Industry Standard Architecture) bus, or the like. The communication bus can include an address bus, a data bus, a control bus, or the like.

The communication interface is used for communication between the aforementioned electronic device and other devices.

The memory may include an RAM (random access memory), or may include a NVM (non-volatile memory), for example at least one disk memory. Optionally, the memory may also be at least one storage device located away from the processor described above.

The processor may be a general-purpose processor, such as a CPU (central processing unit), an NP (network processor), or the like; it may also be a DSP (digital signal processor), an ASIC (application specific integrated circuit), an FPGA (field-programmable gate array) or other programmable logic devices, a discrete gate or transistor logic device, a discrete hardware component.

An embodiment of the application further provides an application program that, when executed, performs the method for switching a bit stream type of a video presentation. The method for switching a bit stream type of a video presentation includes:

determining a plurality of video presentations that have been started;

determining a current split screen mode according to the number of the started video presentations;

determining a bit stream type corresponding to the current split screen mode according to a preset correspondence between split screen modes and bit stream types; and switching a bit stream type of each started video presentation according to the determined bit stream type or bit stream types.

In the embodiments above, after a plurality of channels of video presentations that have been started are determined, the current split screen mode is determined according to the number of channels of the determined video presentations. The bit stream type corresponding to the current split screen mode is determined according to the preset correspondence between the split screen modes and the bit stream types. The bit stream type of each started video presentation is switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

An embodiment of the application further provides a storage medium for storing an application program. The application program, when executed, performs the method for switching a bit stream type of a video presentation. The method for switching a bit stream type of a video presentation includes:

determining a plurality of video presentations that have been started;

determining a current split screen mode according to the number of the started video presentations;

determining a bit stream type corresponding to the current split screen mode according to a preset correspondence between split screen modes and bit stream types; and switching a bit stream type of each started video presentation according to the determined bit stream type or bit stream types.

In the embodiments above, after a plurality of channels of video presentations that have been started are determined, the current split screen mode is determined according to the number of channels of the determined video presentations. The bit stream type corresponding to the current split screen mode is determined according to the preset correspondence between the split screen modes and the bit stream types. The bit stream type of each started video presentation is switched according to the determined bit stream type. In the embodiments of the present application, the correspondence between the split screen modes and the bit stream types is preset. The bit stream type corresponding to the current split screen mode may be determined according to the correspondence, and the bit stream type of each video presentation is then switched. This solves the problem that the bit stream types of video presentations in respective split screens cannot be properly adjusted because the bit stream types required are not known. The client is thus protected from crashing due to insufficient memory.

Since the embodiments of the apparatus, the electronic device, the application, and the storage medium for switching a bit stream type of a video presentation are substantially the same as the embodiments of the method for switching a bit stream type of a video presentation, the description for the former are relatively simply. The related parts may be referred to the description of the embodiments of the method for switching a bit stream type of a video presentation shown in FIG. 1-3.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The embodiments described above are merely preferred embodiments of the present application, and not intended to limit the scope of the present application. Any modifications, equivalents, improvements or the like within the spirit and principle of the application should be included in the scope of the application.

The invention claimed is:

1. A method for switching a bit stream type of a video presentation, comprising:

determining a plurality of video presentations that have been started;

determining a current split screen mode according to the number of the started video presentations;

determining at least one bit stream type corresponding to the current split screen mode according to a preset correspondence between split screen modes and bit stream types;

wherein the preset correspondence between the split screen modes and the bit stream types comprises a preset correspondence between the split screen modes and default bit stream types and a preset correspondence between the split screen modes and supported bit stream types;

the step of determining at least one bit stream type corresponding to the current split screen mode according to a preset correspondence between split screen modes and bit stream types, comprises:

determining a default bit stream type corresponding to the current split screen mode according to the preset correspondence between the split screen modes and the default bit stream types; and determining at least one supported bit stream type corresponding to the current split screen mode according to the preset correspondence between the split screen modes and the supported bit stream types, wherein the default bit stream type is comprised in the at least one supported bit stream type; and wherein the method further comprises:

when the number of split screens corresponding to the current split screen mode is greater than or equal to the number of split screens corresponding to a split screen mode determined last time, switching a bit stream type of each newly started video presentation to the determined default bit stream type; and for each previously started video presentation, when the bit stream type of the previously started video presentation is not comprised in the determined at least one supported bit stream type, switching the bit stream type of the previously started video presentation to a bit stream type in the determined at least one supported bit stream type.

2. The method of claim 1, further comprising:

for each previously started video presentation, when the bit stream type of the previously started video presentation is comprised in the determined at least one supported bit stream type, keeping the bit stream type of the previously started video presentation unchanged.

3. The method of claim 1, wherein the step of switching the bit stream type of the previously started video presentation to a bit stream type in the determined at least one supported bit stream type comprises:
switching the bit stream type of the previously started video presentation to a bit stream type with the highest video quality in the determined at least one supported bit stream type.

4. A method for switching a bit stream type of a video presentation, comprising:
determining a plurality of video presentations that have been started;
determining a current split screen mode according to the number of the started video presentations;
determining at least one bit stream type corresponding to the current split screen mode according to a preset correspondence between split screen modes and bit stream types;
wherein the preset correspondence between the split screen modes and the bit stream types comprises a preset correspondence between the split screen modes and default bit stream types;
the step of determining at least one bit stream type corresponding to the current split screen mode according to a preset correspondence between split screen modes and bit stream types, comprises:
determining a default bit stream type corresponding to the current split screen mode according to the preset correspondence between the split screen modes and the default bit stream types;
wherein the method further comprises:
when the number of split screens corresponding to the current split screen mode is less than the number of split screens corresponding to a split screen mode determined last time,
for each previously started video presentation,
when the video quality corresponding to the bit stream type of the previously started video presentation is lower than the video quality corresponding to the determined default bit stream type, switching the bit stream type of the previously started video presentation to the determined default bit stream type.

5. The method of claim 1, further comprising:
receiving a request for switching a bit stream type of a started video presentation, wherein the request contains a target bit stream type that is a bit stream type in the at least one supported bit stream type corresponding to the current split screen mode; and
switching the bit stream type of the started video presentation to the target bit stream type.

6. A method for switching a bit stream type of a video presentation, comprising:
determining a plurality of video presentations that have been started;
determining a current split screen mode according to the number of the started video presentations;
determining at least one bit stream type corresponding to the current split screen mode according to a preset correspondence between split screen modes and bit stream types;
switching a bit stream type of each started video presentation according to the determined bit stream type or bit stream types;
determining whether each started video presentation is being recorded; and for each video presentation being recorded, generating a video file for the video presentation being recorded, and recording the video presentation under the bit stream type that has been switched to; and obtaining and merging all video files of the video presentation after the recording of the video presentation is finished.

7. An electronic device, comprising a processor and a memory; wherein
the memory is configured for storing an application program; and
the processor is configured for executing the application program stored in the memory to carry out the method for switching a bit stream type of a video presentation of claim 1.

8. A non-transitory storage medium for storing an application program that, when executed, performs the method for switching a bit stream type of a video presentation of claim 1.

9. The method of claim 1, wherein when the number of split screens corresponding to the current split screen mode is less than the number of split screens corresponding to a split screen mode determined last time, for each previously started video presentation, when the video quality corresponding to the bit stream type of the previously started video presentation is lower than the video quality corresponding to the determined default bit stream type, switching the bit stream type of the previously started video presentation to the determined default bit stream type;
when the video quality corresponding to the bit stream type of the previously started video presentation is not lower than the video quality corresponding to the determined default bit stream type, keeping the bit stream type of the previously started video presentation unchanged.

10. The method of claim 1, further comprising:
determining whether each started video presentation is being recorded; and
for each video presentation being recorded, generating a video file for the video presentation being recorded, and recording the video presentation under the bit stream type that has been switched to; and obtaining and merging all video files of the video presentation after the recording of the video presentation is finished.

11. The method of claim 4, further comprising:
when the number of split screens corresponding to the current split screen mode is less than the number of split screens corresponding to a split screen mode determined last time,
for each previously started video presentation, when the video quality corresponding to the bit stream type of the previously started video presentation is not lower than the video quality corresponding to the determined default bit stream type, keeping the bit stream type of the previously started video presentation unchanged.

12. The method of claim 4, further comprising:
receiving a request for switching a bit stream type of a started video presentation, wherein the request contains a target bit stream type that is a bit stream type in at least one supported bit stream type corresponding to the current split screen mode; and
switching the bit stream type of the started video presentation to the target bit stream type.

13. The method of claim 4, further comprising:
determining whether each started video presentation is being recorded; and for each video presentation being recorded, generating a video file for the video presentation being recorded, and recording the video presentation under the bit stream type that has been switched to; and obtaining and merging all video files of the video presentation after the recording of the video presentation is finished.

14. An electronic device, comprising a processor and a memory, wherein the memory is configured for storing an application program; and the processor is configured for executing the application program stored in the memory to carry out the method for switching a bit stream type of a video presentation of claim 4.

15. A non-transitory storage medium for storing an application program that, when executed, performs the method for switching a bit stream type of a video presentation of claim 4.

16. An electronic device, comprising a processor and a memory, wherein the memory is configured for storing an application program; and the processor is configured for executing the application program stored in the memory to carry out the method for switching a bit stream type of a video presentation of claim 6.

17. A non-transitory storage medium for storing an application program that, when executed, performs the method for switching a bit stream type of a video presentation of claim 6.

18. An electronic device, comprising a processor and a memory, wherein the memory is configured for storing an application program; and the processor is configured for executing the application program stored in the memory to carry out the method for switching a bit stream type of a video presentation of claim 2.

19. An electronic device, comprising a processor and a memory, wherein the memory is configured for storing an application program; and the processor is configured for executing the application program stored in the memory to carry out the method for switching a bit stream type of a video presentation of claim 3.

20. An electronic device, comprising a processor and a memory, wherein the memory is configured for storing an application program; and the processor is configured for executing the application program stored in the memory to carry out the method for switching a bit stream type of a video presentation of claim 9.

* * * * *